INVENTORS:
William L. Freeze, John Cocker III a
Thomas F. Suggs,
BY Paul & Paul
ATTORNEYS.

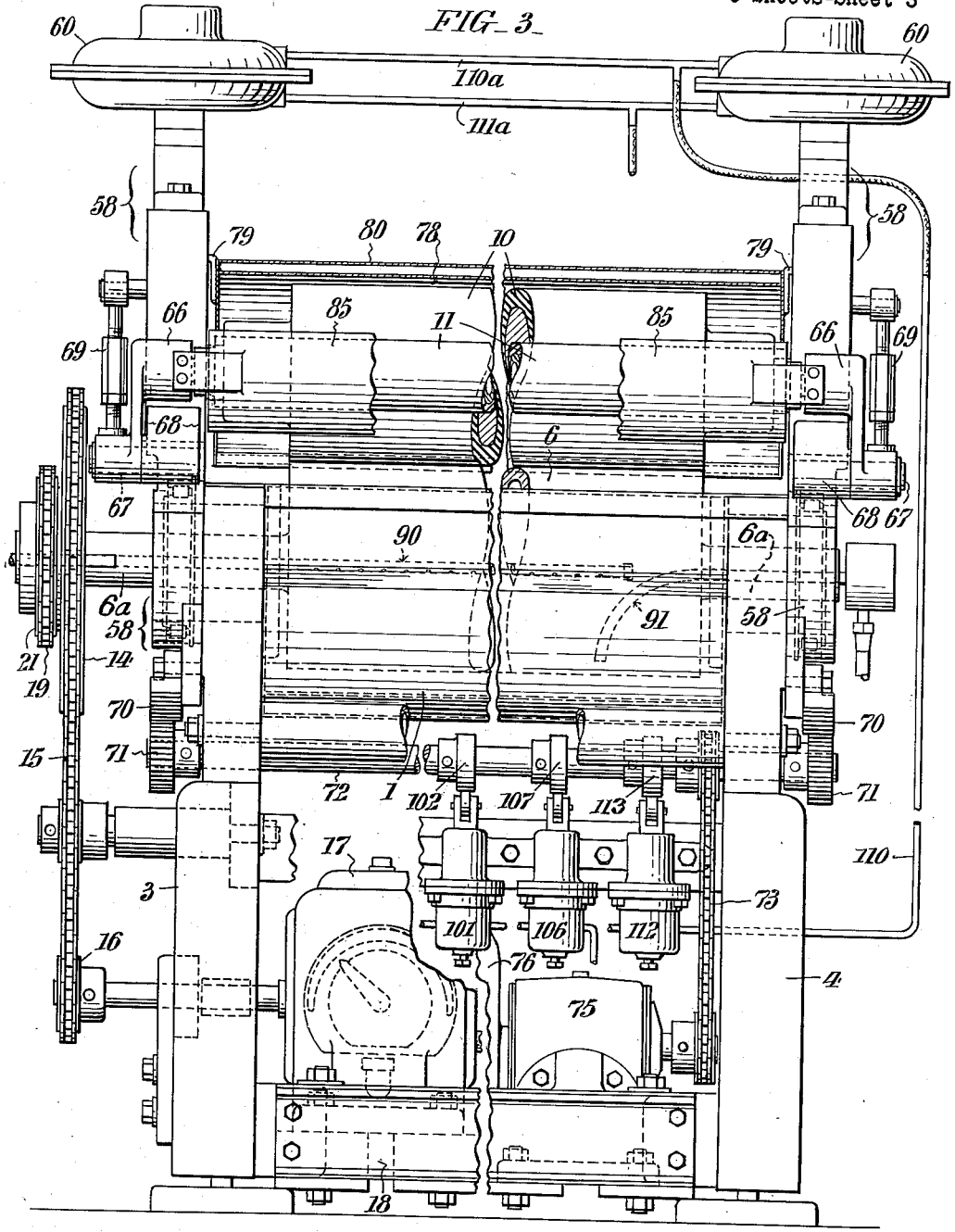

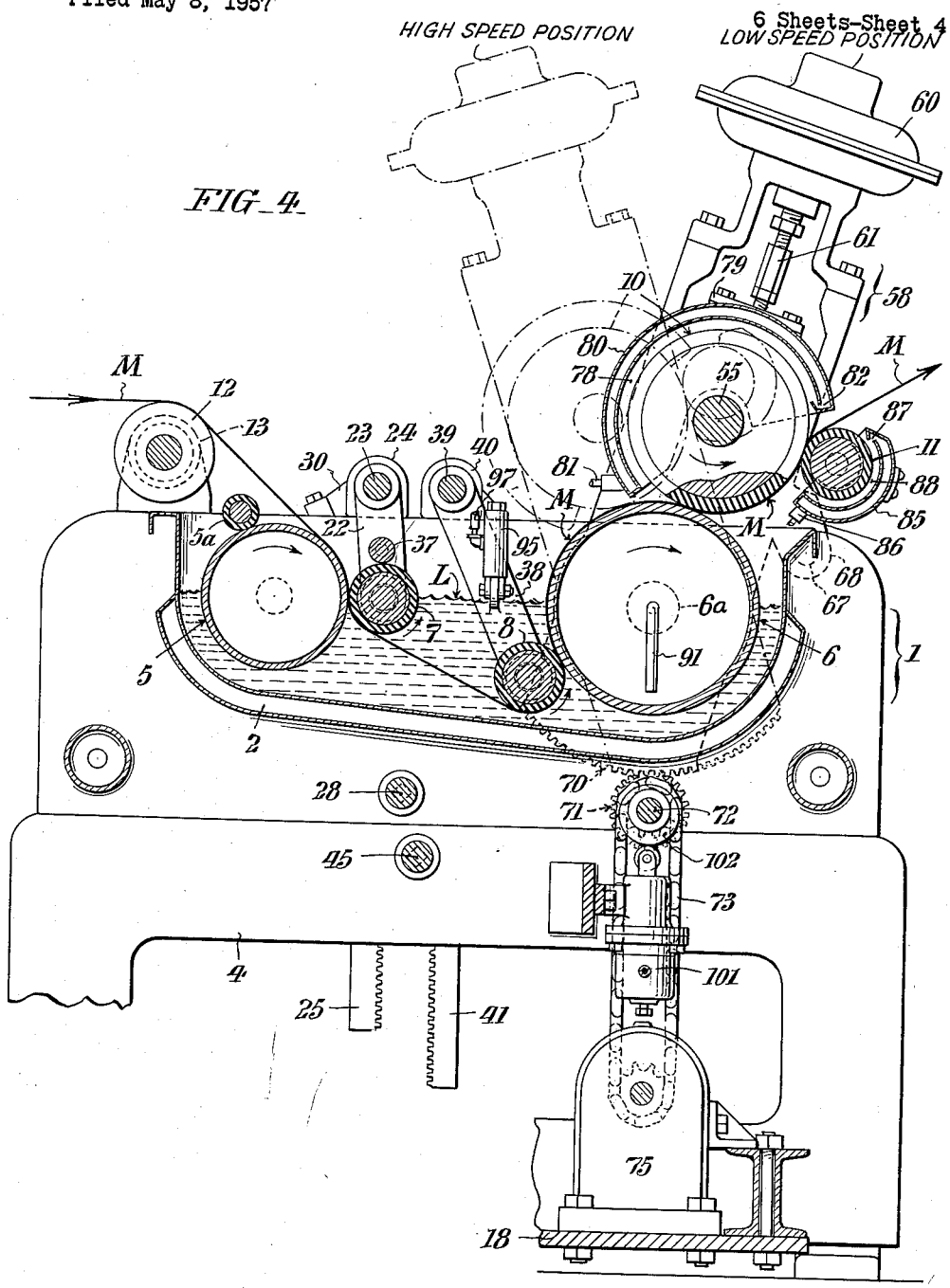

April 4, 1961  W. L. FREEZE ET AL  2,977,662
APPARATUS FOR TREATMENT OF TEXTILES WITH LIQUIDS
Filed May 8, 1957  6 Sheets-Sheet 5
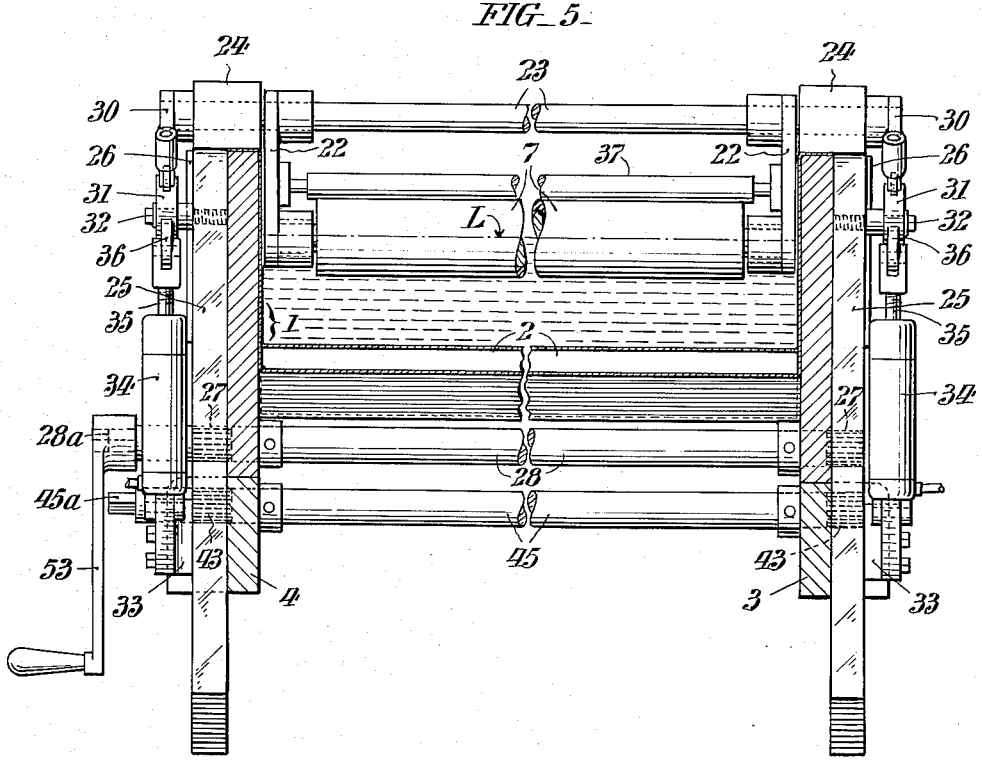
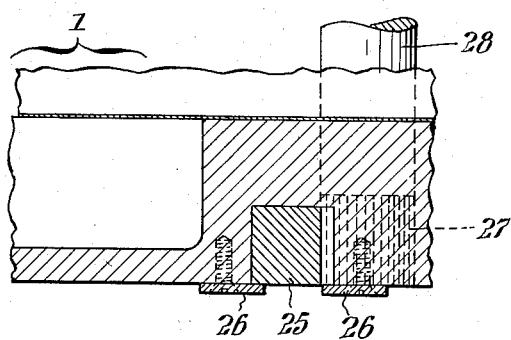
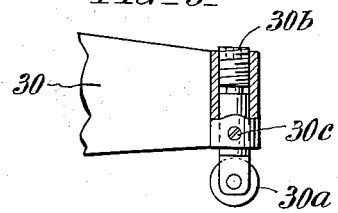
INVENTORS:
William L. Freeze, John Cocker III &
Thomas F. Suggs,
BY Paul & Paul
ATTORNEYS.

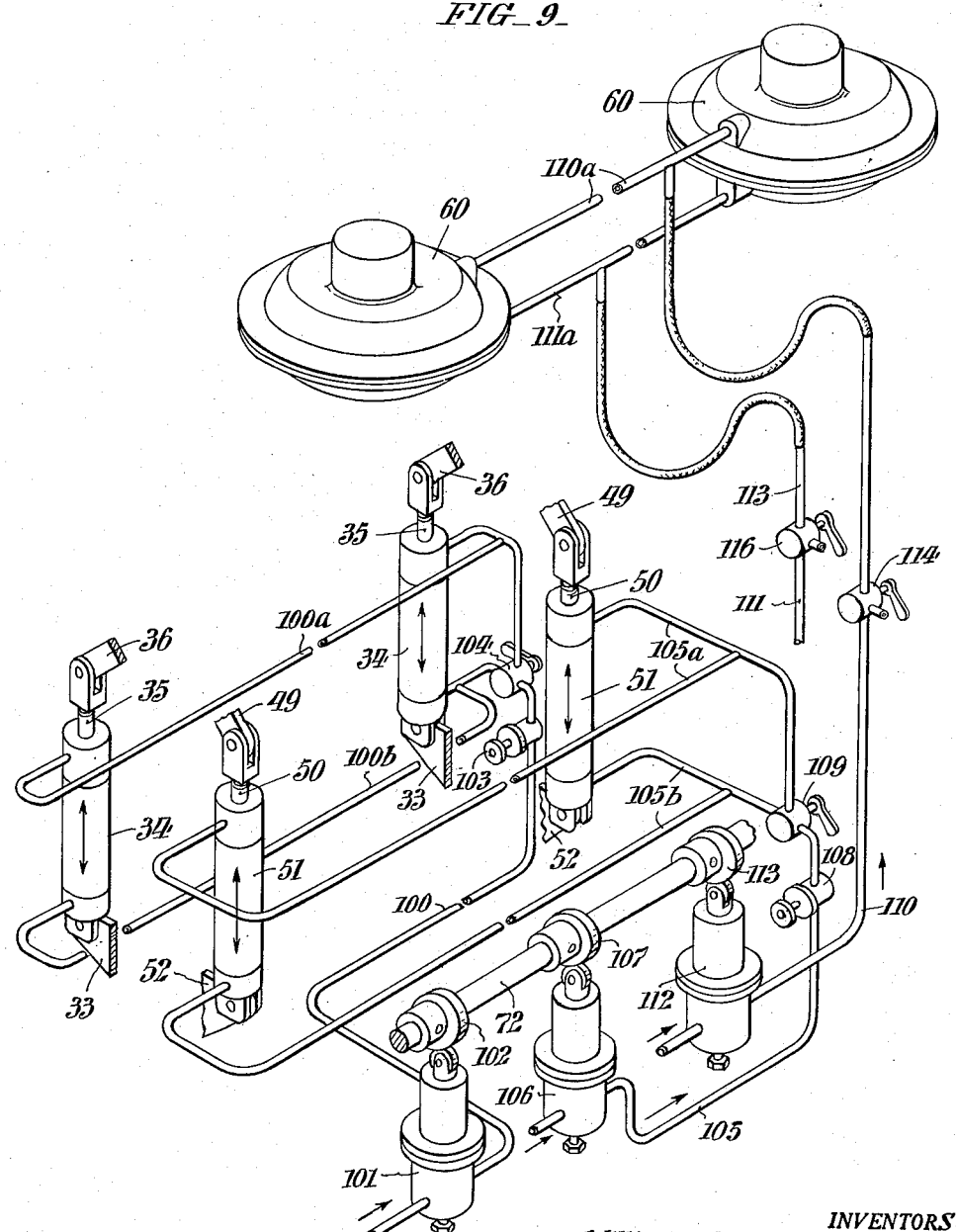

2,977,662
Patented Apr. 4, 1961

2,977,662

APPARATUS FOR TREATMENT OF TEXTILES WITH LIQUIDS

William L. Freeze, John Cocker III, and Thomas F. Suggs, Gastonia, N.C., assignors to Cocker Machine and Foundry Company, Gastonia, N.C., a corporation of North Carolina Filed May 8, 1957, Ser. No. 657,765

37 Claims. (Cl. 28—28)

This invention relates to apparatus for treating continuous running materials such as yarn, fabrics, and the like with liquids such as sizing, dyes, resins, rinses, fixers etc., and also to methods of carrying out such treatment.

Our invention has for its chief aim, the provision of an apparatus of the kind referred to having improved incorporated means whereby entrained air is expelled from the material just before it is run submerged in a bath of the treating liquid and thereby pre-conditioned to rapidly absorb the liquid, and also improved means, operative upon emergence of the material from the bath, for removing the excess liquid from the material so that only a definite uniform amount is retained.

A further aim of our invention is to provide, in connection with apparatus having the above attributes, automatic means whereby the action of the air expelling means and of the excess liquid removing means is controlled in accordance with the speed at which the material is progressed in the apparatus, for attainment of uniform results under all conditions of operation.

Other objects and attendant advantages will appear from the following detailed description of the attached drawings, wherein:

Fig. 3 is a view of the apparatus in end elevation as seen from the right of Fig. 2.

Fig. 4 shows the apparatus in longitudinal section.

Fig. 5 is a cross sectional view taken as indicated by the angled arrows V—V in Fig. 2.

Figs. 6 and 7 are fragmentary sectional views taken as indicated respectively by the arrows VI—VI and VII—VII in Fig. 2.

Fig. 8 is a fragmentary detail view of one of the elements of the apparatus; and Fig. 9 is a diagrammatic view in perspective showing the means provided for automatically controlling the air expelling means and the excess liquid expelling means compensatively with changes in the speed of travel of the material in the apparatus.

Figure 1:
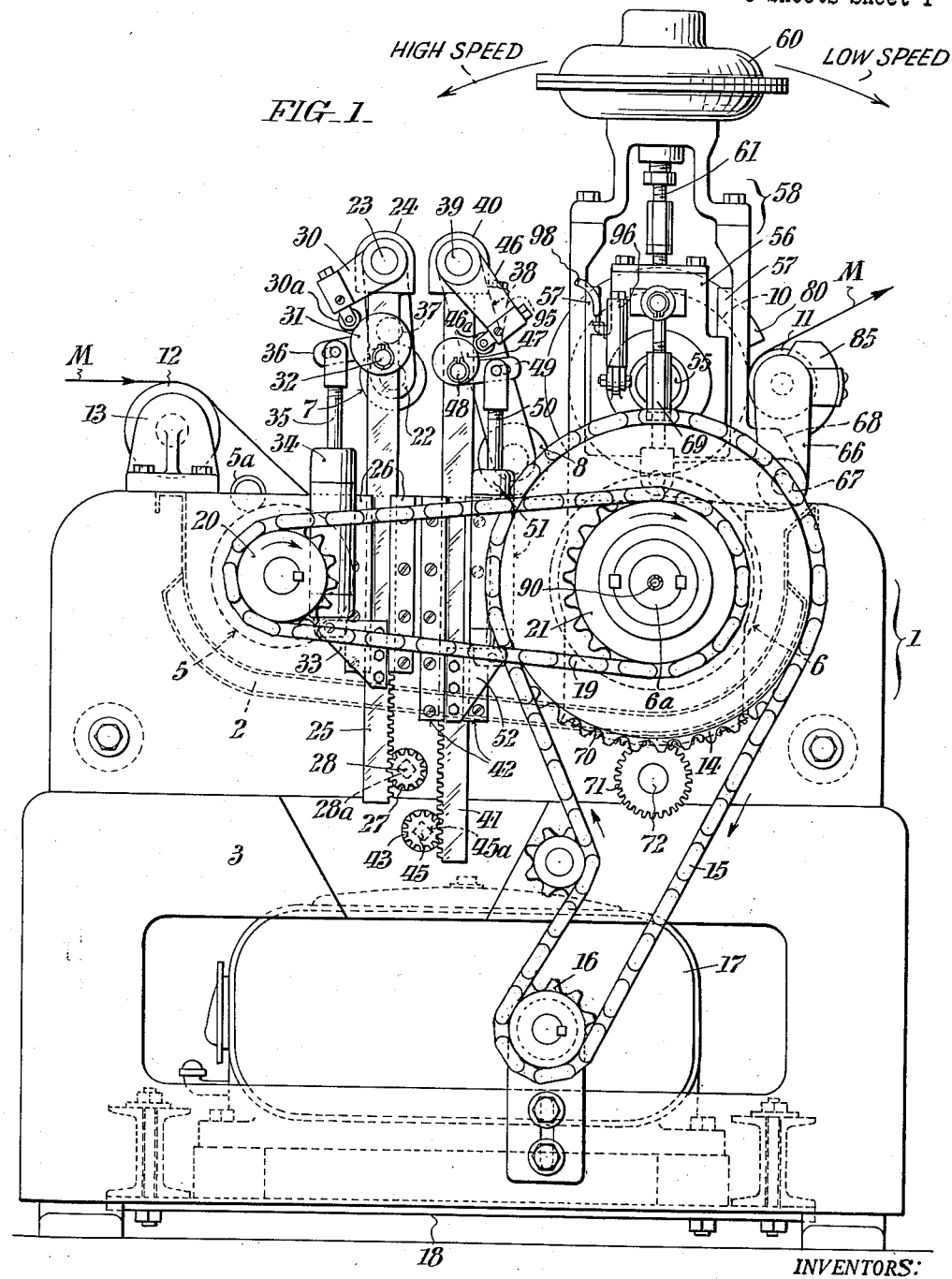
Fig. 1 is a view, in side elevation, of an apparatus for continuously treating running yarns or fabric with a treating liquid in accordance with our new method, the apparatus being shown in readiness for threading the yarns or fabric through it.

As herein exemplified, the apparatus comprises a trough 1 of which the bottom is jacketed as at 2 for circulation of a tempering medium, such as steam or hot water therethrough, the trough being supported crosswise of the tops of a pair of spaced side frames 3 and 4.

Normally maintained in the trough 1 at a level L, see Fig. 4, is a quantity of treating liquid; and running partly submerged in the liquid are two spaced hollow rolls 5 and 6 preferably of stainless steel or other metal immune against corrosion, the first roll 5 being of a diameter somewhat less than that of the second roll 6. A rubber covered wiper roll, designated 5a serves to keep the exposed portion of the roll 5 clean of the liquid. Cooperative with the first roll 5 within the trough 1 is a smaller rubber-sheathed squeeze roll 7 which is normally only partly submerged in the liquid and cooperative with the roll 6 is a smaller padder roll 8 which is normally completely submerged. It is to be particularly noted that the disposal of the squeeze roll 7 relative to the roll 5 is such that the nip between them is substantially at the level of the liquid in the trough to insure that the air entrained in the fabric is displaced just before the material enters the liquid. Also cooperative with the roll 6 is a superimposed solid rubber covered quetch roll 10, and in turn cooperative with the latter is a small rubber covered dressing roll 11.

The material M being treated is drawn from a supply beam (not illustrated), and directed, as shown in Fig. 4, down into the trough 1 over a lead-in roll 12 journalled in bearings 13 atop the sides of the trough adjacent one end of the latter, to pass downwardly of the first roll 5 then beneath the squeeze and padder rolls 7 and 8, then up over the second roll 6 through the nip between it and the quetch roll 10, then upwardly about the quetch roll, and finally over the dressing roll 11 enroute to a collecting beam (not illustrated).

Figure 6:
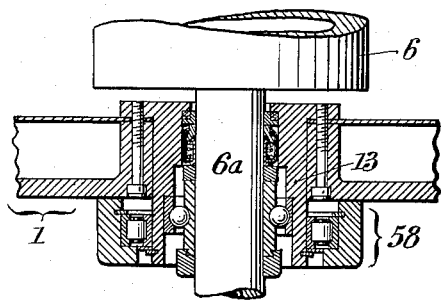

The journals of the roll 5 are supported for free rotation in suitably packed bearings in the side walls of the trough 1, while the ends of the shaft 6a of the roll 6 are rotatively supported, as instanced in Fig. 6, in ball bearing assemblies 13 set into the side walls of the trough. To one end of the shaft 6a of roll 6 is secured a sprocket wheel 14 (Figs. 1 and 3) which is driven, through a chain 15, from a sprocket pinion 16 on the shaft of a regulatable speed gear unit 17. The roll 5 is positively driven at the same peripheral speed as the roll 6 through a chain 19 trained about a sprocket pinion 20 on the shaft of the former and a sprocket wheel 21 on the shaft of the latter.

As best seen in Figs. 1 and 5, the squeeze roll 7 is suspended by fixed arms 22 on a cross shaft 23 whereof the opposite ends are engaged in bearings 24 at the top ends of toothed rack bars 25 constrained to endwise or up and down movement in vertical grooves in the outer faces of the side walls of frames 3 and 4 and held to said grooves by retaining strips designated 26. Meshing with the rack bars 25 are spur pinions 27 respectively at opposite ends of a cross shaft 28 rotatively borne in the side walls of the trough 1 below the trough bottom. As further shown in Fig. 5, the ends of the rock shaft 23 extend outwardly beyond the bearings 24 at the tops of the rack bars 25, and affixed to them are short arms 30 having, at their distal ends, small rollers 30a that bear upon the edges of eccentric cams 31 which are movable about projecting studs 32 on said rack bars. As instanced in Fig. 8, the small rollers 30a are adjustable in the arms 30 and fixable in adjusted positions by means of screws 30b and 30c respectively. Fulcrumed at their bottom ends to lateral brackets 33 on the rack bars 25 are cylinders 34 whereof the piston rods 35 are pivotally connected to short lever extensions 36 of the eccentric cams 31. The stainless steel wiper roll indicated at 37 serves to keep the front or upper exposed portion of the squeeze roll 7 clean of the liquid.

The padder roll 8 is similarly suspended within the trough by arms 38 fast on a cross shaft 39 whereof the opposite ends are engaged in bearings 40 at the top ends of rack bars 41, the latter being slidable in vertical grooves in the outer faces of the side walls of frames 3 and 4 and held to said grooves by keeper strips 42. Also similarly, the rack bars 41 mesh with spur pinions 43 at opposite ends of a separate cross shaft 45 rotatively borne in the side walls of the trough 1 below the trough bottom. Here also, short arms 46, affixed to opposite ends of the cross shaft 39, have adjustable rollers 46a that bear upon eccentric cams 47 movable about projecting studs 48 on the rack bars 41, the short lever extensions 49 of said eccentric cams being connected to the piston rods 50 of pressure fluid cylinders 51 which, at their lower ends, are fulcrumed to lateral brackets 52 on said rack bars.

It is to be noted from Figs. 1 and 5 that corresponding ends of the pinion shafts 28 and 45 are squared off respectively as at 28a and 45a to enable application of a hand crank such as indicated at 53. By this means it is possible to elevate the rack bars 25 and 41 individually and thereby raise the rolls 7 and 8 from within the trough as shown in Fig. 1 to facilitate initial threading of the material M through the apparatus.

Figure 2:
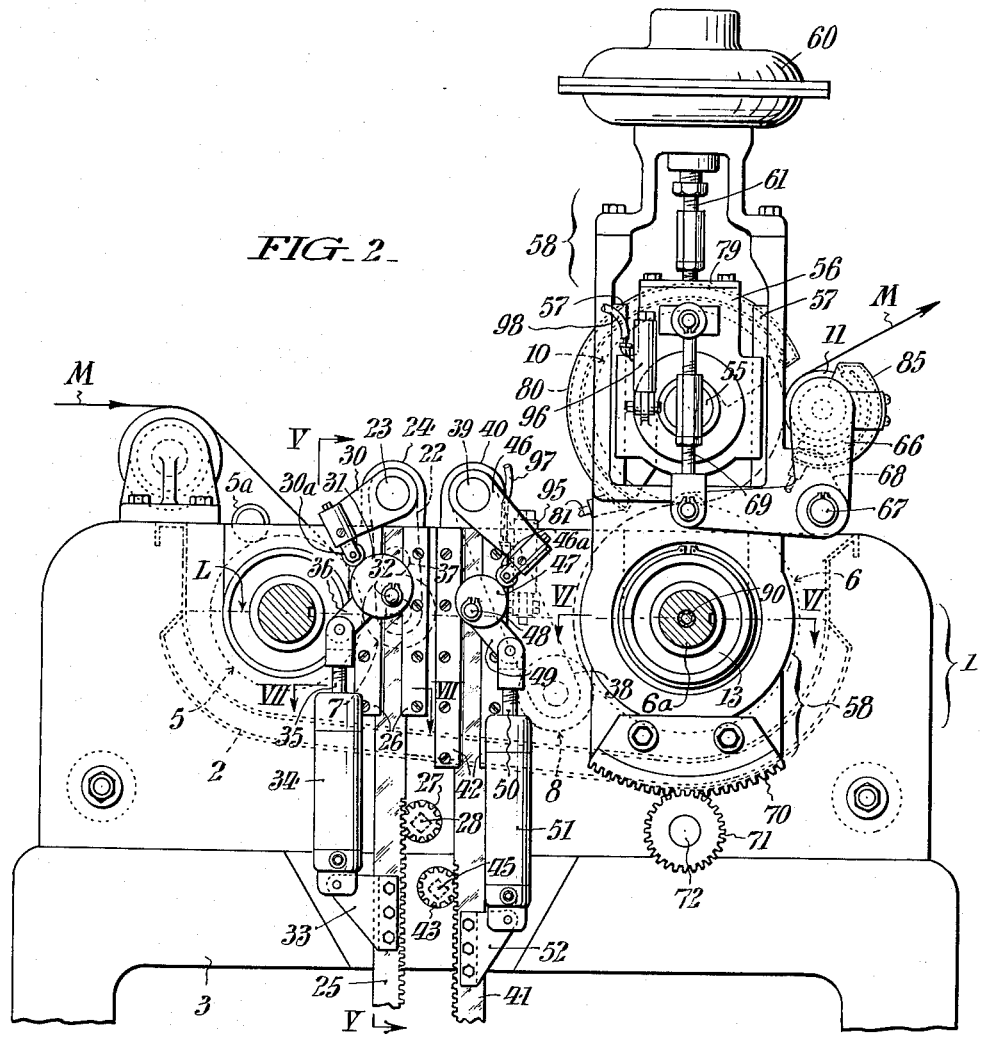
Fig. 2 is a view generally similar to Fig. 1 with the drive means removed, showing the apparatus in operating condition.

Referring to Figs. 1 and 2, the journals 55 of the quetch roll 10 are engaged in bearing blocks 56 slidably confined to longitudinal guideways 57 in upstanding carrier arms 58 which are fulcrumed, as instanced in Fig. 6, on the protruding end housings of the inset bearings 13 wherein the roll 6 is journalled. Atop the arms 58 are pressure fluid-actuated devices in the form of diaphragm motors 60 of which the pendent stems 61 are adjustably connected to the bearing blocks 56.

The dressing roll 11 has its journals engaged respectively in the short upright extremities of bell crank levers 66 fulcrumed on fixed studs 67, the longer or horizontal extremities of said bell crank levers being coupled, by means of adjustable links 69, to the bearing blocks 56.

Bolted to the carrier arms 58 at their bottoms are gear sectors 70 which are in mesh with spur pinions 71 at the outer ends of another transverse shaft 72, said shaft being operable through a sprocket chain 73 (see Figs. 3 and 4) by a reversible servo motor 75.

Surrounding the exposed surface portion of the quetch roll 10 with slight intervening clearance 78 is a shroud 80 in the form of a hollow hook which is curved concentrically with said roll, and which is secured at opposite ends, by brackets 79 to the slide bearing blocks 56 of the quetch roll. During operation of the apparatus, a pressurized gaseous tempering medium, such as steam, is introduced into the shroud 80 adjacent one of its longitudinal edges as at 81, for ultimate discharge into the clearance interval 78 through a slit 82 (Fig. 4) in the inner wall of the shroud adjacent the opposite longitudinal edges of the latter. A similar shroud 85 is provided for the dressing roll 11 into which steam is introduced through hose 86 adjacent one longitudinal edge for discharge through a lengthwise slit 87 in the inner wall of said shroud adjacent its opposite longitudinal edge. Since, during the operation of the apparatus, the rolls 5 and 6 rotate in the direction of the arrows thereon in Fig. 4, the steam is carried around within the intervals 78 and 88 to keep the rolls 10 and 11 warm and moist and thereby prevent premature chilling and hardening of the sizing on the material M as it rounds said rolls. For a similar purpose the submerging roll 6 is kept heated from within by steam introduced axially thereof at one end through a pipe 90 and exhausted from the other end through a pipe 91 (Figs. 3 and 4).

In order to enhance the effectiveness of the padder roll 8, a vibrator 95 (Figs. 1, 2 and 4) is connected to each of the arms 38 by which said roll is suspended. For a like reason each of the slide bearing blocks 56 for the quetch roll 10 has connected thereto a vibrator 96. The vibrators 95 and 96 are shown as being of a pneumatically actuated type to which compressed air is conducted through flexible tubes 97 and 98 respectively.

Compressed air for operation of the cylinders 34 influential upon the squeeze roll 7 is supplied through a pipe line 100 (Fig. 9) having branches 100a and 100b which respectively extend to the upper and lower ends of said cylinders. Interposed in the pipe line 100 is a plunger type control valve 101 which is arranged to be actuated by a cam 102 on the shaft 72, a flow regulating valve 103, and a manually-operable switch valve 104. Normally, the switch valve 104 is set for admission of compressed air by way of the branch pipe 100b to the lower ends of the cylinders 34 and exhaust from the upper ends of said cylinders by way of the pipe branch 100a, for maintenance of the squeeze roll 7 in engagement with the roll 5. Similarly, compressed air for operation of the cylinder 51 influential upon the padder roll 8 is supplied through a pipe 105 having branches 105a and 105b extending, respectively, to the upper and lower ends of said cylinders. Interposed in the pipe line 105 is a control valve 106 similar to the control valve 101, arranged to be actuated by a separate cam 107 on the shaft 72, a pressure regulating valve 108, and a manual switch valve 109 which later is normally set to admit compressed air, by way of the branch pipe 105b, to the lower ends of the cylinders 51 and to permit exhaust from the upper ends of said cylinders by way of the pipe branch 105a for maintenance of the padder roll 8 in engagement with the roll 6. By way of two other pipe lines 110 and 111 having branches 110a and 111a, compressed air is supplied respectively to tops and the bottoms of the diaphragm motors 60 influential upon the quetch roll 10. Interposed in the pipe line 110 is a plunger type valve 112 arranged to be actuated by a third cam 113 on the shaft 72, and a manual shut off valve 114. The pipe line 111 is provided with a shut off valve 116 only. Normally, the valve 114 is set in open position for admission of compressed air into the tops of the diaphragm motors 60, and the valve 116 in closed position for exhaust from the bottoms of said motors.

*Operation*

Assume the apparatus to be running in Figs. 2 and 4 with the rolls 5 and 6 turning in the direction of the arrows thereon. As the material M passes between the unsubmerged portion of the roll 5 (kept clean by the wiper roll 5a) and the squeeze roll 7 with its wiper roll 37, it is held against said roll 5 under pressure by the action of the cylinder 34. As a result, the entrained air is forced out of the material and the latter is thereby pre-conditioned to rapidly absorb the treating liquid upon entering the bath and underpassing the squeeze roll 7. In upwardly rounding the padder roll 8 and passing between it and the roll 6, the absorbed liquid is caused to thoroughly pentrate the material due to the pressure exerted upon the padder roll by action of the cylinders 51, even penetration of the liquid being assured through the constant vibration induced in said padder roll by the vibrators 95. As the material M emerges from the bath and passes between the roll 6 and the quetch roll 10 (which is maintained in contact with the roll 6 under pressure by the action of the diaphragm motors 60) excess liquid is displaced from the material and drains back into the trough, the liquid so removed being prevented from congealing due to the heating of the roll 6 from within. Finally, as the material passes between the quetch roll 10 and the associated dressing roll 11, any liquid which may have been trapped under the material in rounding the roll 6 is removed, the steam discharged from shrouds 80 and 85 incidentally serving to prevent congealing of the liquid on the bare portions of the rolls 10 and 11.

In practice, a suitable means (not illustrated) is provided to cause the servo motor 75 to partially turn in one direction or the other when the regulator 17 is adjusted to increase or decrease the speed of the roll 6 and, in turn, the rate of travel of the material M through the apparatus, so that, through the cams 102, 107 and 113 (Fig. 9) on the shaft 72 chain geared to the servo motor will act upon the plunger valves 101, 106 and 112, for compensative increase or decrease of the air supplied to the upper ends of the cylinders 34 and 51 and to the upper ends of the diaphragm motors 60. In this way more or less pressure is caused to be exerted proportionately upon the squeeze and padder rolls 7 and 8 and upon the quetch roll 10 as may be required or desired in the treatment of different kinds of yarns or textile materials run through the apparatus. Due to turning of the shaft 72, the arms 58 will be tilted either to the left or to the right of vertical center as shown in full and dotted lines in Fig. 4 so that the material will pass about more or less of the surface of the roll 6. It is to be understood that the operation is such that when the speed of travel of the material M is increased, the pressure on the squeeze, dressing roll 11 and padder rolls 7 and 8 is increased and the quetch roll 10 is moved leftward about the roll 6, and vice versa. According to our invention therefore, the material is evenly treated with assurance of uniform absorption of the liquid throughout the length and breadth of the sheet regardless of the speed of travel of the material.

When new material is to be threaded in the apparatus, the switch valves 104, 109, 114 and 116 are set for admission of air to the lower ends of the cylinders 34 and 51 and into the lower ends of the diaphragm motors 60 and to permit exhaust from the upper ends of said cylinders and said diaphragm motors. The pressure on the squeeze and padder rolls 7 and 8 is thereby removed and the quetch roll 10 is raised clear of the roll 6. By thereupon turning the pinion shafts 28 and 45, the squeeze and padder rolls 7 and 8 will be lifted clear of the rolls 5 and 6 respectively. With the rolls 7, 8 and 10 thus cleared, it is obvious that the new material can be easily and quickly threaded through the apparatus.

It is to be understood that we do not consider ourselves limited to the precise details of construction herein shown by way of example, since these may be varied or modified in many ways without departing from the spirit of the invention as will be readily understood by those schooled in the textile treating art.

Having thus described our invention, we claim:

1. In apparatus for treating continuous material such as yarn or textile fabric with liquid, a trough for the liquid; a roll running partly submerged in the liquid and over which the material passes downward into the liquid; wiper means for keeping the exposed portion of the primary roll clean of the liquid; a cooperative squeeze roll so disposed relative to the first mentioned roll that the nip between them through which the material is passed is substantially at the level of the liquid in the trough to insure displacement of entrained air from the material just before the material enters the liquid; and means for exerting pressure upon the squeeze roll.

2. In apparatus for treating continuous material such as yarn or textile fabric with liquid, a trough for the liquid; a roll running partly submerged in the liquid and over which the material passes downward into the liquid; wiper means for keeping the exposed portion of the roll clean of the liquid; a cooperative squeeze roll so disposed relative to the first mentioned roll that the nip between them through which the material is passed is substantially at the level of the liquid in the trough to insure displacement of entrained air from the material just before the material enters the liquid; a rock shaft rotatively supported above the trough; a pair of suspension arms affixed to the rock shaft, in the distal ends of which arms the squeeze roll is journalled; and means for exerting pressure upon the squeeze roll including eccentric cams pivotally supported respectively at opposite sides of the trough and engaged respectively by follower arms at opposite ends of the rock shaft, and pressure fluid cylinders supported at opposite sides of the trough with their piston rods connected respectively to lever extensions of the eccentric cams.

3. Apparatus according to claim 2, wherein the rock shaft is rotatively borne in the upper ends of slides respectively constrained in vertical guides exteriorly of opposite sides of the trough; wherein the cams are mounted on the respective slides, wherein the cylinders are pivoted at their lower ends to the respective slides; and further including a crank shaft with toothed pinions thereon in meshing engagement with rack teeth on the respective slides, whereby the squeeze roll can be raised clear of the first mentioned roll to facilitate initial threading of the material in the apparatus.

4. In apparatus for treating continuous material such as warp yarn or textile fabric with liquid, a trough for the liquid; a roll running partly submerged in the liquid and about which the material passes after emerging from the liquid; a cooperative padder roll between which and the first mentioned roll the material is passed while in the liquid; means for exerting pressure upon the padder roll to insure penetration of the liquid through the material; and means for vibrating the padder roll in a direction toward and away from the first mentioned roll to increase the effectiveness of its padding action.

5. In apparatus for treating continuous material such as warp yarn or textile fabric with liquid, a trough for the liquid; a roll running partly submerged in the liquid and about which the material passes after emerging from the liquid; a cooperative padder roll between which and the first mentioned roll the material is passed while in the liquid; a rock shaft rotatively supported above the trough; a pair of suspension arms affixed to the shaft in the distal ends of which arms the padder roll is journalled; and means for exerting pressure upon the padder roll including eccentric cams pivotally supported respectively at opposite sides of the trough and engaged respectively by follower arms at opposite ends of the rock shaft, and pressure fluid cylinders at opposite sides of the trough with their piston rods connected respectively to lever extensions of the eccentric cams.

6. Apparatus according to claim 5, further including a vibrator connected to at least one of the suspension arms in which the padder roll is journalled.

7. Apparatus according to claim 5, wherein the rock shaft is rotatively borne in the upper ends of slides respectively constrained in vertical guides exteriorly of opposite sides of the trough; wherein the cams are mounted on the respective slides and the cylinders are pivoted at their lower ends to the respective slides; and further including a crank shaft with toothed pinions thereon in meshing engagement with rack teeth on the respective slides, whereby the padder roll can be raised clear of the first mentioned roll to facilitate initial threading of the material in the apparatus.

8. In apparatus for treating continuous material, such as warp yarns or textile fabric with liquid, a trough for the liquid; a first roll running partly submerged in the liquid and over which material passes down into the liquid; a second roll spaced from the first roll also partly submerged in the liquid and over which the material passes after emerging from the liquid; a squeeze roll between which and the first roll material is passed just before entry into the liquid for displacement of entrained air from the material; a padder roll between which and the second roll the material is passed while in the liquid; separate means for exerting pressure upon the squeeze roll and upon the padder roll; and means for vibrating the padder roll toward and away from the second roll.

9. In apparatus for treating continuous material such as warp yarn or textile fabric with liquid, a trough for the liquid; a first roll running partly submerged in the liquid and over which the material passes downward into the liquid; a second roll spaced from the first roll also running partly submerged in the liquid and over which the material passes after emerging from the liquid; a squeeze roll between which and the first roll the material is passed just before entry into the liquid for displacement of entrained air from the material; a rock shaft rotatively supported above the trough; a pair of suspension arms affixed to the rock shaft, in the distal ends of which arms the squeeze roll is journalled; means for exerting pressure upon the squeeze roll including eccentric cams pivotally supported respectively at opposite sides of the trough and engaged respectively by follower arms at opposite ends of the rock shaft, and pressure fluid cylinders at opposite sides of the trough with their piston rods connected respectively to lever extensions of the eccentric cams; a padder roll between which and the second roll the material is passed while in the liquid; and separate means for exerting pressure upon the padder roll.

10. Apparatus according to claim 9, in which the means for exerting pressure upon the padder roll is substantially identical with that provided for the squeeze roll.

11. Apparatus according to claim 9, wherein the rock shaft is rotatively borne in the upper ends of slides constrained respectively in guides exteriorly of opposite sides of the trough; wherein the cams are mounted on the slides, and wherein the cylinders are pivoted at their lower ends to the respective slides; and further including a crank shaft with toothed pinions thereon in meshing engagement with rack teeth on the respective slides whereby the squeeze roll can be raised clear of the first mentioned roll to facilitate initial threading of the material in the apparatus.

12. Apparatus according to claim 9, wherein the rock shaft is rotatively borne in the upper ends of slides constrained respectively in guides exteriorly of opposite sides of the trough; wherein the cams are mounted on the slides, and wherein the cylinders are pivoted at their lower ends to the respective slides; further including a crank shaft with toothed pinions thereon in meshing engagement with rack teeth on the respective slides whereby the squeeze roll can be raised clear of the first mentioned roll to facilitate initial threading of the material in the apparatus; and wherein means substantially identical with the means for exerting pressure upon and for raising the squeeze roll, is provided for the padder roll.

13. In apparatus for treating continuous material such as yarn or textile fabric with liquid, a trough for the liquid; a roll running partly submerged in the liquid and over passed by the material after the material has traversed the liquid; speed regulatable means for driving the roll; a quetch roll cooperative with the first mentioned roll from above and between which and the first mentioned roll the material is passed for displacement of excess liquid from the material; and a journal supporting means for the quetch roll fulcrumed on the axis of the first mentioned roll; and means for moving said journal supporting means to position the quetch roll to one side of vertical center when the speed of the first mentioned roll is increased or to the other side of vertical center when the speed of said first mentioned roll is decreased.

14. Apparatus according to claim 13, wherein the first mentioned roll is hollow, and further including means for circulating a tempering fluid through said first mentioned roll.

15. Apparatus according to claim 13, further including a dressing roll with journals laterally of the supporting means for the quetch roll between which dressing roll and the quetch roll the material is finally passed.

16. Apparatus according to claim 13, further including a shroud affixed to the supporting means in which the quetch roll is journalled, said shroud being in the form of a hollow hood arcuate in cross section and surrounding the exposed portion of the quetch roll and spaced by a narrow intervening clearance from the peripheral surface of the quetch roll, said hood having, at one of its transverse edges, an inlet for a pressurized gaseous tempering medium and a slot along its other transverse edge for discharge of the tempering medium upon the peripheral surface of the quetch roll in the direction of rotation of the latter.

17. Apparatus according to claim 13, further including a dressing roll carried by the supporting means in which the quetch roll is journalled and between which dressing roll and the quetch roll the material is finally passed; a shroud affixed to the supporting means for the quetch roll, said shroud being in the form of a hollow hood arcuate in cross section and surrounding the exposed portion of the quetch roll and spaced by a narrow intervening clearance interval from the peripheral surface of the quetch roll, said hood having, at one of its transverse edges, an inlet for a pressurized gaseous tempering medium and a slot along its other transverse edge for discharge of the tempering medium upon the peripheral surface of the quetch roll in the direction of rotation of the latter; and a similar shroud also affixed to the supporting means in which the quetch roll is journalled, surrounding the exposed portion of the dressing roll.

18. In apparatus for treating continuous material such as yarn or textile fabric with liquid, a trough for the liquid; a roll running partly submerged in the liquid and over passed by the material after the material has traversed the liquid; bearings at opposite sides of the trough in which the roll is journalled; speed regulatable means for driving the roll; a pair of upward arms fulcrumed on outward extensions of the aforesaid bearings; a quetch roll cooperative with the first mentioned roll from above, between which and the latter roll, the material is passed for displacement of excess liquid therefrom; journals for the quetch roll slidable in longitudinal slots respectively in said arms; and means for moving the arm about their fulcra to position the quetch roll to one side of vertical center when the speed of the first mentioned roll is increased and to the other side of vertical center when the speed of said first mentioned roll is decreased.

19. Apparatus according to claim 18, wherein the means for changing the position of the quetch roll includes a reversible servo motor; a transverse shaft arranged to be driven by the motor and having toothed pinions fixed thereon; and toothed sectors respectively at the bottom ends of the two arms in meshing engagement with said pinions.

20. Apparatus according to claim 18, further including pressure fluid-actuated devices affixed to the upper ends of the respective arms and connected respectively to the journals of the quetch roll; and control means automatically operative to increase the supply of pressure fluid to said devices when the quetch roll is positioned to one side of vertical center and to decrease the supply of pressure fluid to said devices when the quetch roll is moved to the other side of vertical center.

21. Apparatus according to claim 18, further including pressure fluid-actuated devices affixed to the upper ends of the respective arms and connected respectively to the journals of the quetch roll; and control means automatically operative to increase the supply of pressure fluid to said devices when the quetch roll is positioned to one side of the vertical center and to decrease the supply of pressure fluid to said devices when the quetch roll is positioned to the other side of vertical center, said control means comprising a valve in a pressure fluid pipe line leading to said devices, and a cam on the transverse shaft for actuating said valve.

22. in apparatus for treating continuous material such as yarn or textile fabric with liquid, a trough for the liquid; a roll running partly submerged in the liquid and over passed by the material after the material has traversed the liquid; speed regulatable means for driving the roll; a quetch roll cooperative with the first mentioned roll from above and between which and the first mentioned roll the material is passed for displacement of excess liquid from the material; guides in which the journals of the quetch roll are engaged with capacity for up and down movement; fluid pressure actuated devices respectively on the guides and connected to the journals of the quetch roll for urging the quetch roll toward the first mentioned roll; and control means operative to decrease the supply of pressure fluid to said devices when the speed of the first mentioned roll is reduced, and to increase the supply of pressure fluid to said devices when the speed of said first mentioned roll is increased.

23. Apparatus according to claim 22, wherein the control means comprises a valve in a pressure fluid pipe line leading to the fluid pressure-actuated devices, a shaft having cams thereon for actuating said valve, and a reversible motor for driving said shaft.

24. Apparatus according to claim 22, wherein the pressure fluid-actuated devices are in the form of diaphragm motors.

25. In apparatus for treating continuous material such as yarn or textile fabric with liquid, a trough for the liquid; a roll running partly submerged in the liquid and overpassed by the material after the material has traversed the liquid; speed regulatable means for driving the roll; a quetch roll cooperative with the first mentioned roll from above and between which and the first mentioned roll the material is passed for displacement of excess liquid from the material; guides in which the journals of the quetch roll are engaged with capacity for up and down movement; fluid pressure actuated diaphragm motors respectively mounted to the tops of the guides; and control means whereby pressure fluid can be admitted to the upper chambers of the diaphragm motors to urge the quetch roll toward the first mentioned roll; and whereby the upper chambers of the diaphragm motors can be exhausted and pressure fluid admitted to the lower chambers of the diaphragm motors to lift the quetch roll clear of the first mentioned roll to facilitate initial threading of the material in the apparatus.

26. In apparatus for treating continuous material such as yarn or textile fabric with liquid, a trough for the liquid; a first roll running partly submerged in the liquid over which the material passes down into the liquid; wiper means for keeping the exposed portion of the first roll clean of the liquid; a cooperative squeeze roll so disposed relative to the first roll that the nip between them through which the material is passed is substantially at the level of the liquid in the trough to insure displacement of entrained air from the material just before the material enters the liquid; a second roll spaced from the said first roll and likewise running partly submerged in the liquid and over which the material passes after emerging from the liquid; a cooperative padder roll underpassed by the material, after leaving the squeeze roll, between which and said second roll the material is passed while in the liquid; a quetch roll cooperative with the said second roll from above between which and the said second roll the material is passed for displacement of excess liquid from the material; and a dressing roll cooperative laterally with the quetch roll between which and the quetch roll the material is finally passed.

27. Apparatus according to claim 26, further including regulatable means for positively driving the second roll; pressure means for urging the quetch roll toward said second roll; and means for automatically controlling the pressure means to increase the pressure exerted upon the quetch roll as the speed of said first and second rolls is increased and vice versa.

28. Apparatus according to claim 26, wherein the second roll is hollow for circulation of a fluent tempering medium therethrough.

29. Apparatus according to claim 26, further including means for vibrating the padder roll in a direction toward and away from the second roll.

30. Apparatus according to claim 26, further including means for vibrating the quetch roll in a direction toward and away from the second roll.

31. Apparatus according to claim 26, further including means for separately vibrating the padder roll and the quetch roll in a direction toward and away from the second roll.

32. Apparatus according to claim 26, further including means for discharging a pressurized gaseous tempering medium upon the exposed portions of the quetch roll and of the dressing roll in the direction of rotation of said rolls.

33. Apparatus according to claim 26, further including regulatable means for driving the second roll; and supporting means for the quetch roll movable about the axis of said second roll whereby the quetch roll can be positioned beyond one side of vertical center in one direction for travel of the material about more of the surface of said second roll when its speed is decreased, or beyond the opposite side of the vertical in the opposite direction for travel of the material about less of the surface of the said second roll when its speed is increased.

34. In apparatus for treating continuous material such as warp yarn or textile fabric with liquid, a trough for the liquid; a first roll running partly submerged in the liquid and over which the material passes down into the liquid; a second roll spaced from the first roll also running partly submerged in the liquid and over which the material passes after emerging from the liquid; a squeeze roll between which and the first roll the material is passed just before entry into the liquid for displacement of entrained air from the material; a padder roll between which and the second roll the material is passed while in the liquid; a quetch roll above the second roll between which and said second roll the material is passed after emergence from the liquid; speed regulatable means for driving the first and second roll; and means automatically operative as the speed of the second roll is increased or decreased to adjust the quetch roll positionally about the second roll and to vary the pressure of the squeeze and the padder rolls upon said first and second rolls respectively.

35. In apparatus for treating continuous material such as warp yarn or textile fabric with liquid, a trough for the liquid; a first roll running partly submerged in the liquid and over which the material passes down into the liquid; a second roll spaced from the first roll also running partly submerged in the liquid and over which the material passes after emerging from the liquid; a squeeze roll between which and the first roll the material is passed just before entry into the liquid for displacement of entrained air from the material; a padder roll between which and the second roll the material is passed while in the liquid; a quetch roll above the second roll between which and said second roll the material is passed after emergence from the liquid; pressure fluid devices for urging the squeeze roll and the padder roll toward the first and second rolls respectively; pressure fluid devices for urging the quetch roll toward the second roll; speed regulatable means for driving the first and second roll; and means automatically operative as the speed of the second roll is increased or decreased to adjust the quetch roll positionally about the second roll and to vary the supply of pressure fluid to the several pressure fluid devices aforesaid.

36. In apparatus for treating continuous material such as yarn or textile fabric with a liquid, a trough for the liquid; a lower roll running partly submerged in the liquid and a quetch roll superposed upon the first roll between which rolls the material is passed upon emergence from the liquid; variable speed means for driving the two rolls; a dressing roll running in engagement with the quetch roll over which the material is finally passed; and means automatically operative to increase the pressure upon the dressing roll as the speed of the first roll and the cooperative quetch roll is increased, and to decrease the pressure upon the dressing roll as the speed of the first roll and the press roll is decreased.

37. The invention according to claim 36 further including means for angularly moving the quetch roll bodily about the lower roll in one direction as the speed of these rolls is increased, and in the opposite direction when the speed of said rolls is decreased.

References Cited in the file of this patent

UNITED STATES PATENTS 775,694     Wisner                Nov. 22, 1904

(Other references on following page)

UNITED STATES PATENTS

| | | |
|---|---|---|
| 2,151,363 | Welder | Mar. 21, 1939 |
| 2,156,090 | Hinnekins | Apr. 25, 1939 |
| 2,627,480 | Heizer | Feb. 3, 1953 |
| 2,664,616 | Smith et al. | Jan. 5, 1954 |
| 2,698,984 | Griffin | Jan. 11, 1955 |
| 2,714,240 | Prescott et al. | Aug. 2, 1955 |
| 2,724,254 | Zanger | Nov. 22, 1955 |
| 2,736,183 | Arnold | Feb. 28, 1956 |
| 2,795,839 | Seawell | June 18, 1957 |
| 2,839,025 | Burke et al. | June 17, 1958 |
| 2,849,784 | Adams | Sept. 2, 1958 |
| 2,862,280 | Suggs | Dec. 2, 1958 |